United States Patent
Matsuoka et al.

(10) Patent No.: US 10,413,987 B2
(45) Date of Patent: Sep. 17, 2019

(54) ARC WELDING CONTROL METHOD

(71) Applicant: Panasonic Intellectual Property Management Co., Ltd., Osaka (JP)

(72) Inventors: Noriyuki Matsuoka, Osaka (JP); Atsuhiro Kawamoto, Hyogo (JP); Junji Fujiwara, Osaka (JP); Kaito Matsui, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 126 days.

(21) Appl. No.: 15/518,320

(22) PCT Filed: Oct. 20, 2015

(86) PCT No.: PCT/JP2015/005269
§ 371 (c)(1),
(2) Date: Apr. 11, 2017

(87) PCT Pub. No.: WO2016/075871
PCT Pub. Date: May 19, 2016

(65) Prior Publication Data
US 2017/0355034 A1    Dec. 14, 2017

(30) Foreign Application Priority Data

Nov. 11, 2014   (JP) ................... 2014-228834

(51) Int. Cl.
*B23K 9/10*   (2006.01)
*B23K 33/00*  (2006.01)
(Continued)

(52) U.S. Cl.
CPC .............. *B23K 9/092* (2013.01); *B23K 9/073* (2013.01); *B23K 9/09* (2013.01); *B23K 9/093* (2013.01); *B23K 9/12* (2013.01); *B23K 9/125* (2013.01)

(58) Field of Classification Search
CPC .......... B23K 9/073; B23K 9/09; B23K 9/092; B23K 9/093; B23K 9/12; B23K 9/125
(Continued)

(56) References Cited

U.S. PATENT DOCUMENTS

2006/0201922 A1   9/2006  Era et al.
2012/0074114 A1*  3/2012  Kawamoto .......... B23K 9/0731
                                                    219/130.21
(Continued)

FOREIGN PATENT DOCUMENTS

EP   3 208 024       8/2017
JP   48-011463 B     4/1973
(Continued)

OTHER PUBLICATIONS

Extended European Search Report dated Nov. 7, 2017 for the related European Patent Application No. 15859785.6.
(Continued)

*Primary Examiner* — Sang Y Paik
(74) *Attorney, Agent, or Firm* — Wenderoth, Lind & Ponack, L.L.P.

(57) ABSTRACT

In controlling an arc welding of consumable electrode type in which pulse welding and short-circuit welding alternately repeat, forward feeding and backward feeding of a welding electrode periodically repeat in a short-circuit welding period. The forward feeding of the welding electrode starts when a welding current is smaller than a base current immediately before a pulse period ends.

9 Claims, 5 Drawing Sheets

(51) Int. Cl.
*B23K 9/09* (2006.01)
*B23K 9/073* (2006.01)
*B23K 9/12* (2006.01)

(58) Field of Classification Search
USPC ..... 219/130.01–130.51, 136, 137 R, 137 PS, 219/137 WM, 137.2–137.9
See application file for complete search history.

(56) References Cited

U.S. PATENT DOCUMENTS

2012/0097654 A1* 4/2012 Kawamoto ............ B23K 9/073
219/125.1
2012/0199567 A1 8/2012 Nakagawa et al.

FOREIGN PATENT DOCUMENTS

| | | |
|---|---|---|
| JP | 60-255276 | 12/1985 |
| JP | 9-150267 | 6/1997 |
| JP | 2006-247710 | 9/2006 |
| WO | 2012/032703 | 3/2012 |

OTHER PUBLICATIONS

International Search Report of PCT application No. PCT/JP2015/005269 dated Jan. 12, 2016.

* cited by examiner

ARC WELDING CONTROL METHOD

This application is a U.S. national stage application of the PCT international application No. PCT/JP2015/005269 filed on Oct. 20, 2015, which claims the benefit of foreign priority of Japanese patent application No. 2014-228834 filed on Nov. 11, 2014, the contents all of which are incorporated herein by reference.

TECHNICAL FIELD

The present invention relates to a consumable electrode-type arc welding control method in which a pulse welding period and a short-circuit welding period are alternately repeated.

BACKGROUND ART

As representative consumable electrode-type arc welding methods, there are pulse welding and short-circuit welding, which have been put to practical use. However, the pulse welding and the short-circuit welding have problems as follows.

The pulse welding has lower heat-input than a spray shift in a constant current exceeding a critical current. However, since an arc length which is long to a certain degree is required to maintain a stable pulse shift, it is not possible to reduce heat-input. Therefore, in so-called position welding, such as vertical welding and overhead welding, a bead, such as a sagging bead, having an unpreferable shape is likely to be generated.

In the short-circuit welding, the arc length is short, and welding defect, such as incomplete fusion, is likely to occur during a short-circuit period since heat-input related to the arc is small. Moreover, sputter is often generated due to the short arc length and short circuit.

To prevent the above-described problems, an arc welding method in which the pulse welding and the short-circuit welding are controlled as to be alternately repeated a predetermined number of times has been proposed (refer to PTL 1). FIG. 4 illustrates a waveform of a welding current when arc welding is controlled in conventional arc welding disclosed in PTL 1. The welding current is controlled such that the pulse welding and the short-circuit welding are alternately performed a predetermined number of times. A welding wire is fed at a constant feeding velocity so as to obtain an optimal value in each of the pulse welding and the short-circuit welding. PTL 1 discloses that welding defect, such as incomplete fusion, or a bead having an unfavorable shape, such as a sagging bead, in position welding can thereby be prevented from occurring by controlling the heat-input and controlling the shape of the bead.

As a method of reliably preventing generation of sputter and performing a short circuit shift in the short-circuit welding, a welding method in which generation of an arc and short circuit is detected, a welding wire is fed (fed forward) in response to generation of an arc and the wire is pulled up (fed backward) in response to generation of short circuit is disclosed (refer to PTL 2).

CITATION LIST

Patent Literature

PTL 1: Japanese Patent Laid-Open Publication No. 60-255276

PTL 2: Japanese Patent Laid-Open Publication No. 48-11463

SUMMARY

In consumable electrode-type arc welding in which a pulse welding period and a short-circuit welding period alternately repeat, forward feeding and backward feeding of a welding wire are repeated in the short-circuit welding period at a constant cycle time. When shifting from the pulse welding period to the short-circuit welding period, the welding wire is started feeding in a forward feeding direction when a current is smaller than a base current immediately before the pulse welding period ends.

DETAIL DESCRIPTION OF PREFERRED EMBODIMENTS

Exemplary Embodiment 1

Figure 1A:
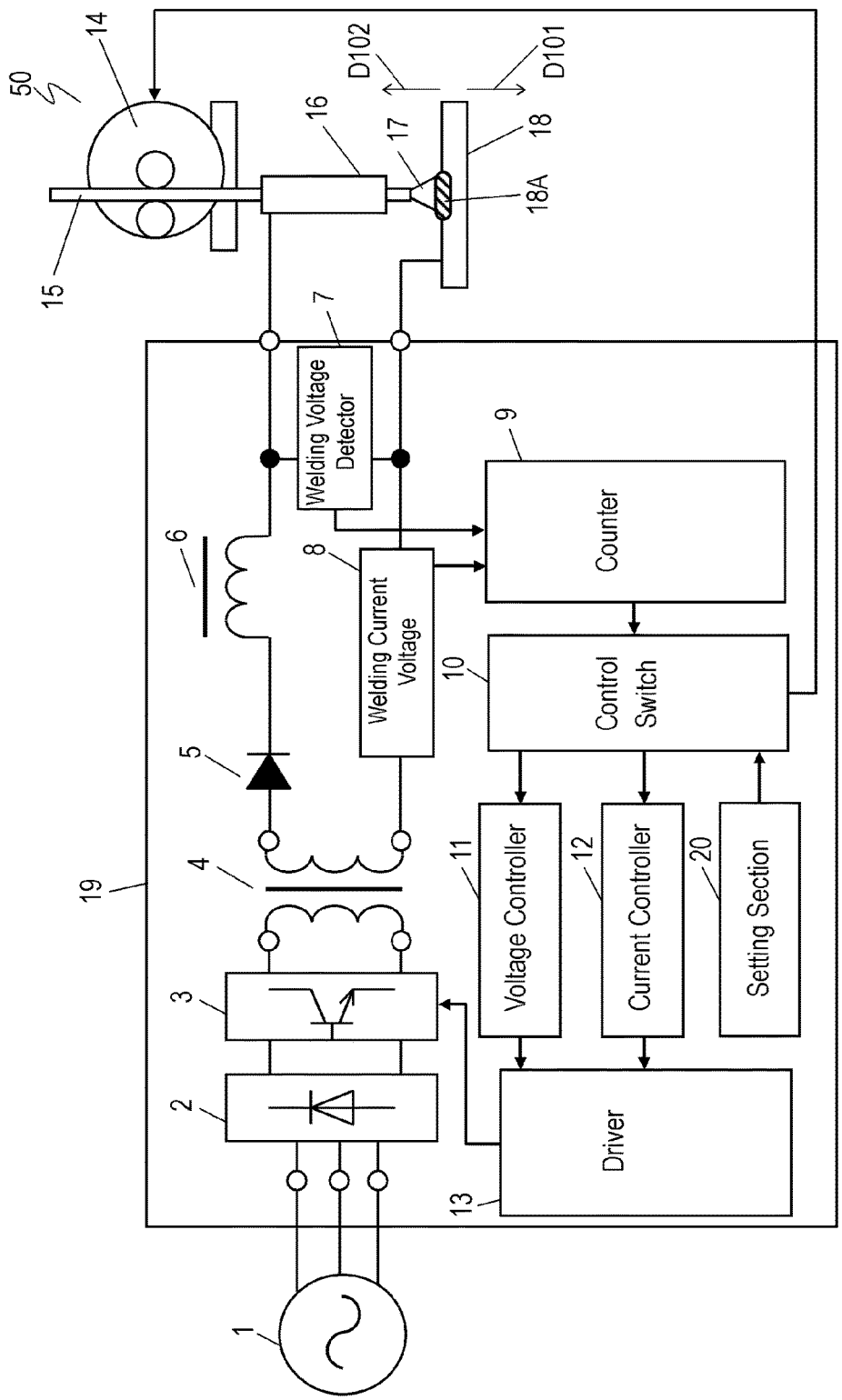
FIG. 1A is a schematic diagram of an arc welding apparatus in accordance with Exemplary Embodiment 1.

FIG. 1A is a schematic diagram of arc welding apparatus 50 in accordance with Exemplary Embodiment 1. Arc welding apparatus 50 mainly includes welding power source 19 that supplies electric power to a place between object 18 and welding wire 15 serving as a welding electrode (consumable electrode), welding torch 16, and feeder 14 that feeds welding wire 15. For example, welding torch 16 is attached to a welding robot, and welding is performed by the welding robot using welding torch 16. Otherwise, for example, an operator may holds welding torch 16, and perform welding with welding torch 16. Feeder 14 can feed welding wire 15 in forward feeding direction D101 toward object 18 and in backward feeding direction D102 away from object 18 opposite to forward feeding direction D101. In welding power source 19, an alternating-current (AC) power input from input power source 1 is rectified by primary rectifier 2, is converted into an AC voltage by switching section 3, is stepped down by transformer 4, is rectified by secondary rectifier 5 and inductor (DCL) 6, and is applied between welding wire 15 and object 18. The applied electric power generates welding arc 17 between welding wire 15 and object 18 to perform welding. Welding power source 19 includes welding voltage detector 7 detecting welding voltage V which is a voltage of welding wire 15, welding current detector 8 detecting a welding current I flowing in welding wire 15, and counter 9 counting a time elapsing in a pulse welding period and a short-circuit welding period or the number of output pulses. Welding power source 19 further includes control switch 10, setting section 20, current controllers 11 and 12, and driver 13. Control switch 10 switches controlling of a welding output based on the number counted by counter 9. Setting section 20 sets welding conditions and the like. Current controller 12 controls the welding current in the pulse welding period. Current controller 11 controls the welding current in the short-circuit welding period. Counter 9 detects a first contact between welding wire 15 and object 18 after an instruction to start welding is provided in response to an operation of a torch switch provided in welding torch 16 or execution of an operation program of the welding robot, thereby counting the time or counting the number of output pulses. Setting section 20 sets a setting welding current set to perform welding, a setting welding voltage set to perform welding, a feeding velocity of welding wire 15, the type of shielding gas, the material of welding wire 15, the diameter of welding wire 15, the period of pulse welding and the number of outputs of waveform, the period of short-circuit welding and the number of outputs of waveform, and the like. Each of the sections configuring welding power source 19 may be independently formed or may be formed by combining plural configuration units, as necessary.

Figure 1B:
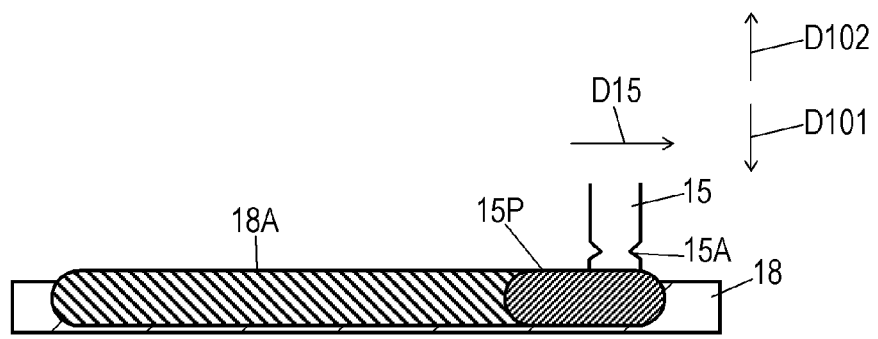
FIG. 1B is a schematic enlarged sectional view of a welding spot of arc welding in accordance with Embodiment 1.

An operation of arc welding apparatus 50 will be described below. FIG. 1B is a schematic enlarged sectional view of a welding spot of arc welding in accordance with Embodiment 1.

In arc welding apparatus 50, while an arc and a welding spot is shielded from the outside air by supplying shielding gas through a gas supply port, welding power source 19 supplies a current between welding wire 15 and object 18. The current generates welding arc 17 between welding wire 15 and object 18, and cause the tip of welding wire 15 and a portion of object 18 to melt due to the heat of welding arc 17. Molten welding wire 15 drips onto object 18 and forms molten pool 15P together with a portion of object 18 which has melted due to the heat of welding arc 17. Molten pool 15P is formed according to a movement of welding torch 16 in welding direction D15 relative to object 18, and forms bead 18A according to the movement in welding direction D15 relative to object 18, thereby welding object 18.

Welding conditions of the welding are previously set through setting section 20, and the feeding velocity of welding wire 15 is also previously set through setting section 20 similarly. Outputs of welding power source 19 and rotations of a motor of feeder 14 are controlled. The welding conditions are controlled by controlling welding power source 19 while welding power source 19 is monitored such that the welding conditions meet the setting conditions. However, welding current I which is a basic element of the controlling, and a waveform of welding current I are obtained from an output of welding current detector 8.

Figure 2:
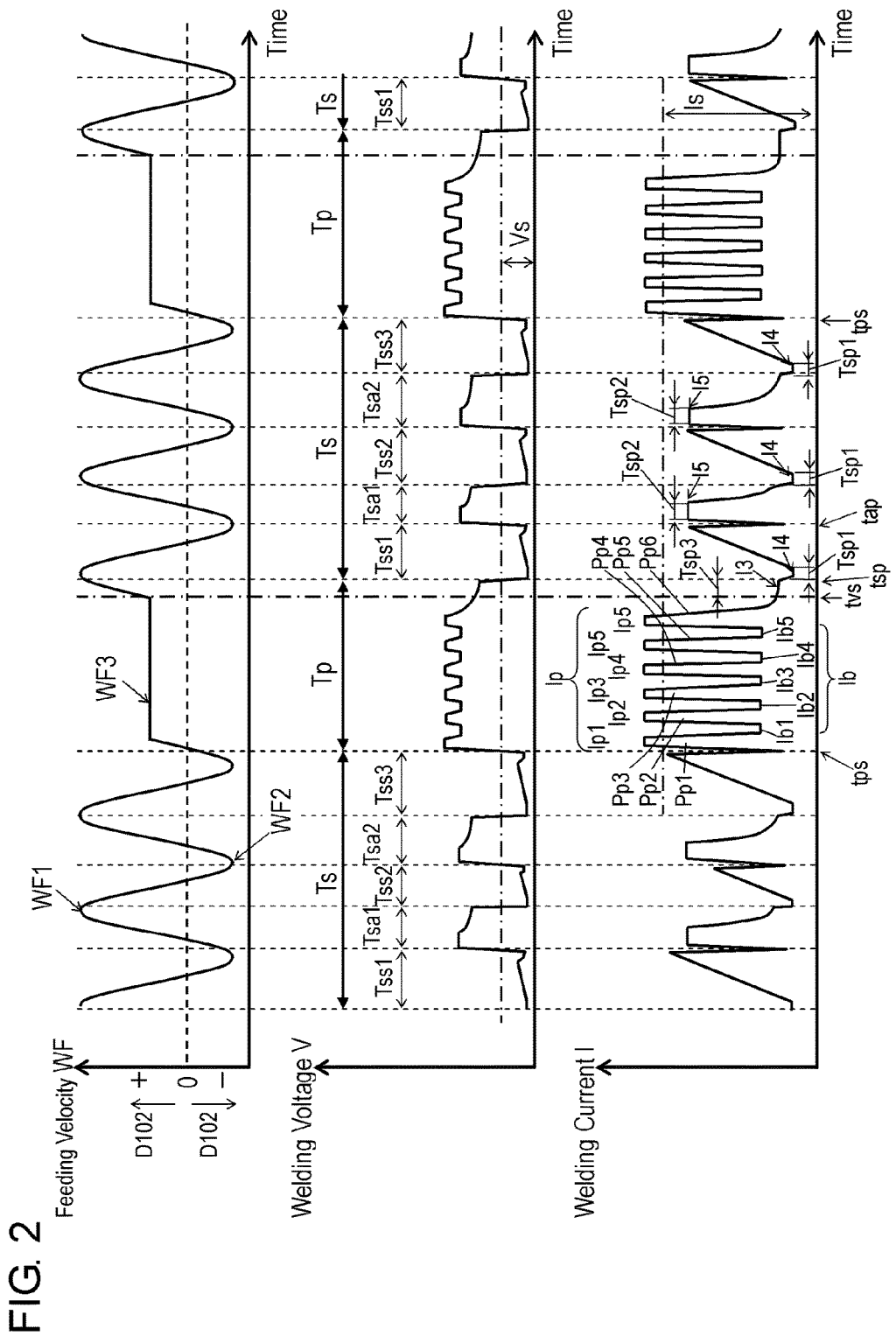
FIG. 2 illustrates a welding current, a welding voltage, and a feeding velocity of a welding wire in arc welding in accordance with Embodiment 1.

FIG. 2 illustrates welding current I, welding voltage V, and feeding velocity WF of welding wire 15 of arc welding apparatus 50 in accordance with Embodiment 1. In FIG. 2, the vertical axes represent welding current I, welding voltage V, and feeding velocity WF while the horizontal axis represents time. Feeding velocity WF can have both positive and negative values. That is, in the case where welding wire 15 serving as the welding electrode is fed in forward feeding direction D101, feeding velocity WF has a positive value. In the case where welding wire 15 is fed in backward feeding direction D102, feeding velocity WF has a negative value.

In pulse welding period Tp, welding current I is controlled such that welding current I flowing in welding wire 15 forms plural pulses Pp1 to Pp6 to alternately have values Ip1 to Ip6 of peak current Ip and values Ib1 to Ib5 of base current Ib. In short-circuit welding period Ts, welding current I is controlled as to shift alternately between one or more short-circuit durations Tss1 to Tss3 for which a short circuit is generated between welding wire 15 and object 18 and one or more arc durations Tsa1 to Tsa2 for which arc 17 is generated between welding wire 15 and object 18. Pulse welding period Tp and short-circuit welding period Ts are alternately repeated such that pulse welding period Tp succeeds short-circuit welding period Ts and short-circuit welding period Ts succeeds pulse welding period Tp.

Pulse welding period Tp is detected based on the waveform of welding current I detected by welding current detector 8. For example, pulse welding period Tp may be detected by detecting that welding current I changes from a value larger than threshold Is to a value smaller than threshold Is. Threshold Is is previously determined The comparison of threshold Is and welding current I allows pulses Pp1 to Pp6 of pulse welding period Tp to be detected. The method of detecting pulses Pp1 to Pp6 is not limited to this example. Any method may be adopted as long as pulses Pp1 to Pp6 can be detected.

Short-circuit welding period Ts may be detected, for example, by detecting that welding voltage V detected by welding voltage detector 7 changes from a value higher than threshold Vs to a value smaller than threshold Vs. Threshold Vs is previously determined In this case, in order to prevent minute short circuit which is extremely short from being determined as short-circuit durations Tss1 to Tss3, an event that welding voltage V is continuously higher than threshold Vs for a predetermined duration may be determined as a short circuit. The method of detecting short circuit is not limited to this example. Any method may be adopted as long as short circuit can be individually detected.

In pulse welding period Tp, in combination with pulse conditions of setting section 20, a value of feeding velocity WF of welding wire 15 is previously set in setting section 20 such that the average value of welding current I does not exceed a critical current. The number of pulses of the welding current or the length of pulse welding period Tp is also previously set in setting section 20. Meanwhile, in short-circuit welding period Ts, a value of welding voltage V with which short-circuit welding can be stably performed at feeding velocity WF is previously set through setting section 20. The number of times of short circuit between welding wire 15 and object 18 in short-circuit welding period Ts, that is, the number of short-circuit durations Tss1 to Tss3 or the length of short-circuit welding period Ts is also previously set in setting section 20. Therefore, in arc welding apparatus 50, control switch 10 switches current controller 12 for pulse welding and current controller 11 for short-circuit welding such that, when pulse welding is performed based on the number or the length of time set through setting section 20, control switch 10 switches the pulse welding to short-circuit welding, and subsequently, short-circuit welding is performed based on the number or the length of time set through setting section 20, thereby outputting a control output from current controllers 11 and 12. Upon receiving the control output from current controllers 11 and 12, driver 13 applies the control output to switching section 3 as to obtain the waveform of welding current I corresponding to the control output. Accordingly, welding power source 19 outputs welding current I illustrated in FIG. 2, and supplies the output welding current I to welding wire 15 and object 18.

Similarly, in pulse welding period Tp and short-circuit welding period Ts, control switch 10 supplies a control output to feeder 14 such that feeding velocity WF of welding wire 15 becomes the feeding velocity previously determined. Accordingly, feeder 14 drives the motor of feeder 14 to rotate the motor such that feeding velocity WF of welding wire 15 becomes the feeding velocity corresponding to pulse welding period Tp and short-circuit welding period Ts. In this case, in pulse welding period Tp, feeder 14 feeds welding wire 15 at predetermined constant feeding velocity WF3 which is optimally set previously through setting section 20. Meanwhile, control switch 10 changes feeding velocity WF of welding wire 15 in short-circuit welding period Ts in accordance with a cyclic waveform having an amplitude and a cycle time previously determined by setting section 20. Feeding velocity WF illustrated in FIG. 2 changes in accordance with a sine wave as the cyclic waveform. Feeding velocity WF may change in accordance with a different cyclic waveform, such as a trapezoidal wave. The short circuit is released at pulse start time point tps when the number of times of short circuit previously set through setting section 20 is counted or the time previously set through setting section 20 elapses. Control switch 10 starts pulse welding period Tp and generates first pulse Pp1 out of pulses Pp1 to Pp6. While feeding velocity WF continuously changes in accordance with the cyclic waveform in short-circuit welding period Ts even after pulse start time point tps, feeding velocity WF changes toward predetermined feeding velocity WF3 of welding wire 15 in pulse welding period Tp previously set through setting section 20. When causing feeding velocity WF to reach predetermined feeding velocity WF3 in pulse welding period Tp, feeder 14 feeds welding wire 15 at predetermined feeding velocity WF3 after the time of the reaching of velocity WF3. After that, in pulse welding period Tp, when the number of times of pulses Pp1 to Pp6 previously set through setting section 20 is counted or the time previously set through setting section 20 elapses, current controller 12 forms last pulse Pp6. After that, current controller 12 changes welding current I to current I3 different from values Ib1 to Ib5 of base current Ib in pulses Pp1 to Pp6. The time when the welding current I changes to the current I3 after the last pulse Pp6 is formed being set as a trigger, at feeding switching time point tvs when welding current I is current I3, feeder 14 changes feeding velocity WF in accordance with the cyclic waveform from predetermined feeding velocity WF3 in pulse welding period Tp, and starts feeding welding wire 15 in forward feeding direction D101 and backward feeding direction D102. In accordance with Embodiment 1, current I3 is smaller than value Ib5 of base current Ib immediately before pulse welding period Tp ends. In accordance with Embodiment 1, current I3 is thus smaller than at least one of values Ib1 to Ib5 of base current Ib. Current I3 may be smaller than the average value of values Ib1 to Ib5 of base current Ib or may be smaller than values Ib1 to Ib5 of base current Ib.

In FIG. 2, the time point when the welding current I changes to current I3 is used as a trigger to shift from the pulse welding period Tp to the short circuit welding period Ts. In accordance with Embodiment 1, before pulse welding period Tp ends, an arbitrary time point when the welding current I is reduced to a value smaller than base current Ib in pulses Pp1 to Ppb before the end of the pulse welding period Tp may be set as the trigger, that is, at feeding switching time point tvs. While pulse welding period Tp and short-circuit welding period Ts are alternately repeated under the setting conditions, and at optimal feeding velocity WF in each mode at the time, welding wire 15 is fed and welding is performed. As illustrated in FIG. 2, in the case where short-circuit durations Tss1 to Tss3 and arc durations Tsa1 and Tsa2 have fluctuations, such fluctuations are likely to appear remarkably when feeding velocity WF and welding wire 15 are controlled such that feeding velocity WF changes in accordance with the cyclic waveform, and that welding wire 15 is fed in forward feeding direction D101 and backward feeding direction D102 after the short circuit is determined or after an arc (release of short circuit) is determined. In arc welding in accordance with Embodiment 1, feeding velocity WF changing in accordance with a cyclic waveform having a constant cycle time allows the operations of short circuit and an arc to be performed in accordance with the cyclic waveform. This reduces fluctuations in the lengths of short-circuit durations Tss1 to Tss3 and arc durations Tsa1 and Tsa2.

Welding current I in accordance with Embodiment 1 will be described below. In Embodiment 1, welding current I is controlled such that welding current I becomes current I3 smaller than base current Ib of pulse Pp6 after last pulse Pp6 when welding is switched from the pulse welding to the short-circuit welding. In first short-circuit duration Tss1 when welding is switched from the pulse welding to the short-circuit welding, after a short circuit between welding wire 15 and object 18 is detected, welding current I is controlled such that welding current I has a value smaller than base current Ib of pulses Pp1 to Pp6. In short-circuit welding period Ts, at least at one time point of a time point at which short circuit is detected and a time point at which neck 15A is detected, welding current I is steeply reduced. Switching from pulse welding period Tp to short-circuit welding period Ts is performed by changing welding current I to current I3 different from base current Ib after pulses Pp1 to Pp6 alternately repeating peak current Ip and base current Ib are output a predetermined number of times or for a predetermined duration previously set through setting section 20. Specifically, welding current I is reduced to current I3 smaller than base current Ib, and then, welding stands by until a short circuit starting short-circuit duration Tss1, that is, starting short-circuit welding period Ts. After that, when welding voltage detector 7 detects a short circuit, welding current I is steeply reduced to current I4 and retained at current I4 for predetermined period Tsp1 in order to prevent a minute short circuit in which the short circuit occurs at short-circuit detecting time point tsp when short-circuit duration Tss1 starts and is released immediately after the short circuit occurs and in order to prevent sputtering at the time of the short circuit. After that, welding current is increased to facilitate releasing the short circuit. When neck 15A (refer to FIG. 1B) of welding wire 15 is detected by welding voltage detector 7 immediately before the short circuit is released, neck-controlling in which welding current I is steeply lowered is preferably performed. This configuration reduces welding current I at the time of short circuit release, prevents sputter. After the short circuit is released at short circuit release time point tap when arc duration Tsa1 starts, current controller 11 increases welding current I to current I5 such that minute short circuit is not generated in arc duration Tsa1 and current I5 is retained for predetermined period Tsp2. After that, in order to promote generation of next short circuit, that is, in order to start next short-circuit duration Tss2, welding current I is reduced. After this operation is repeated and short circuit is performed the number or for the time previously set through setting section 20, the pulse welding mode starts and pulse welding period Tp starts simultaneously to the release of the short circuit. Welding current I is controlled such that welding current I forms pulses Pp1 to Pp6 in which welding current I alternately repeats peak current Ip and base current Ib. In accordance with Embodiment 1, arc welding shifts from short-circuit welding period Ts to pulse welding period Tp after the last short circuit is released, that is, after last short-circuit duration Tss3. Short-circuit welding period Ts shifts to pulse welding period Tp preferably after the last short circuit is released, that is, after last short-circuit duration Tss3 and after feeding velocity WF of welding wire 15 reaches predetermined constant feeding velocity WF3 in pulse welding period Tp.

In consumable electrode-type arc welding alternately repeating the pulse welding period and the short-circuit welding period, in the case that an arc welding method in which a welding wire (consumable electrode) is constantly fed in each of the pulse welding period and the short-circuit welding period is adopted, sputter is likely to be generated at the time of releasing a short circuit in the short-circuit welding period.

In accordance with Embodiment 1, after last pulse Pp6 when arc welding shifts from pulse welding period Tp to short-circuit welding period Ts, in other words, when pulse welding period Tp shifts to short-circuit welding period Ts, the time point when feeder 14 starts feeding welding wire 15 in forward feeding direction D101 in accordance with the cyclic waveform having a constant predetermined cycle time is controlled based on welding current I of current I3 smaller than base current Ib in pulse welding period Tp immediately before pulse welding period Tp ends. This configuration can facilitate the next short circuit, generate the short circuit while preventing the growth of a droplet, and prevents sputter at the time of the short circuit. Welding current I is retained at current I3 smaller than base current Ib for a predetermined duration. This configuration prevents an undershoot of welding current I occurring when shifting from peak current Ip of pulse welding period Tp toward the initial current of short-circuit duration Tss1 of short-circuit welding period Ts, thereby performing welding stably. In first short-circuit duration Tss1 when pulse welding period Tp is switched to short-circuit welding period Ts, welding current I after detecting short circuit is controlled such that welding current I becomes current I3 smaller than base current Ib of pulse welding period Tp. This configuration reliably generates the short circuit between welding wire 15 and object 18, prevents minute short circuit short which is caused when short circuit is released immediately after the short circuit, and prevents the sputter. In short-circuit welding period Ts, at least at one time point of a time point when the short circuit is detected and a time point when neck 15A is detected, welding current I is steeply reduced. This configuration reduces current I at the time of the short circuit and at the time of the short circuit release, accordingly reducing sputter at the time of short circuit and at the time of the short circuit release.

Welding current I controlled as described above prevents a phenomenon, such as sputter, from occurring upon switching welding periods Tp and Ts even if a pulse welding of high heat input and a short circuit welding of low heat input are alternately repeated at a short cycle time. Therefore, a welding method having advantages of both the welding methods can be realized. The number or times of pulses Pp1 to Pp6 and the number of times or the duration of short-circuit durations Tss1 to Tss3 are appropriately combined together, thereby easily controlling heat input. In short-circuit welding period Ts, welding wire 15 cyclically fed provides a constant cycle time of the short circuit and the arc and stable welding. In switching from short-circuit welding period Ts to pulse welding period Tp, or in switching from pulse welding period Tp to short-circuit welding period Ts, welding wire 15 is continuously fed in accordance with the cyclic waveform in short-circuit welding period Ts. There-fore, feeding velocity WF does not change discontinuously, and stable welding can be realized.

As described above, in an arc welding of consumable electrode type which uses an arc welding apparatus 50 including a welding electrode 15, plural pulse welding periods Tp and plural short-circuit welding periods Ts are alternately shifted. Arc welding apparatus 50 performs arc welding for the plural pulse welding periods Tp and short-circuit welding for the plural short-circuit welding periods Ts. A welding current I flowing in the welding electrode 15 is controlled in each pulse welding period Tp of the plural pulse welding periods Tp such that the welding current I forms plural pulses Pp1 to Pp6 alternately repeating one or more values Ip1 to Ip6 of a peak current Ip and one or more values Ib1 to Ib5 of a base current Ib, and becomes smaller than at least one of the one or more values Ib1 to Ib5 of the base current Ib (becomes current I3) at a feeding switching time point tvs after forming the plural pulses Pp1 to Pp6. The welding current I is controlled in respective one short-circuit welding period Ts out of the plural short-circuit welding periods Ts succeeding each pulse welding period Tp as to shift alternately to one or more short-circuit durations Tss1 to Tss3 for which a short circuit between the welding electrode 15 and an object 18 is generated and to one or more arc durations Tsa1 and Tsa2 for which an arc 17 between the welding electrode 15 and the object 18 is generated. The arc welding apparatus 50 is controlled as to feed the welding electrode 15 in a forward feeding direction D101 toward the object 18 and in a backward feeding direction D102 opposite to the forward feeding direction D101. The arc welding apparatus 50 is controlled as to start, at the feeding switching time point tvs, feeding the welding electrode 15 alternately and repetitively in the forward feeding direction D101 and the backward feeding direction D102 at a constant cycle time, and feed the welding electrode 15 alternately and repetitively in the forward feeding direction D101 and the backward feeding direction D102 at the constant cycle time from the feeding switching time point tvs through respective one short-circuit welding period Ts.

The arc welding apparatus 50 may be controlled as to feed the welding electrode 15 at a predetermined constant feeding velocity WF3 until the feeding switching time point tvs in each pulse welding period Tp.

A short circuit between the object 18 and the welding electrode 15 or a neck 15A of the welding electrode 15 in respective one short-circuit welding period Ts may be detected. In this case, the welding current I may be reduced upon detecting the short circuit or the neck 15A.

The welding current I may be controlled in each pulse welding period Tp such that the welding current I becomes smaller than an average value of the one or more values Ib1 to Ib5 of the base current Ib at the feeding switching time point tvs.

The welding current I may be controlled in each pulse welding period Tp such that the welding current I becomes smaller than the one or more values Ib1 to Ib5 of the base current Ib at the feeding switching time point tvs.

As described above in detail, in arc welding in accordance with Embodiment 1, for controlling the heat input and controlling the shape of bead 18A, the pulse welding and short-circuit welding are alternately repeated a predetermined number of times provides a welding method having advantages of both the welding methods. The number of times of the short-circuit welding and the number of times of the pulse welding are appropriately combined together, thereby allowing the heat input to be easily controlled. This configuration improves the shape of bead 18A, and easily performs position welding.

Exemplary Embodiment 2

Figure 3:
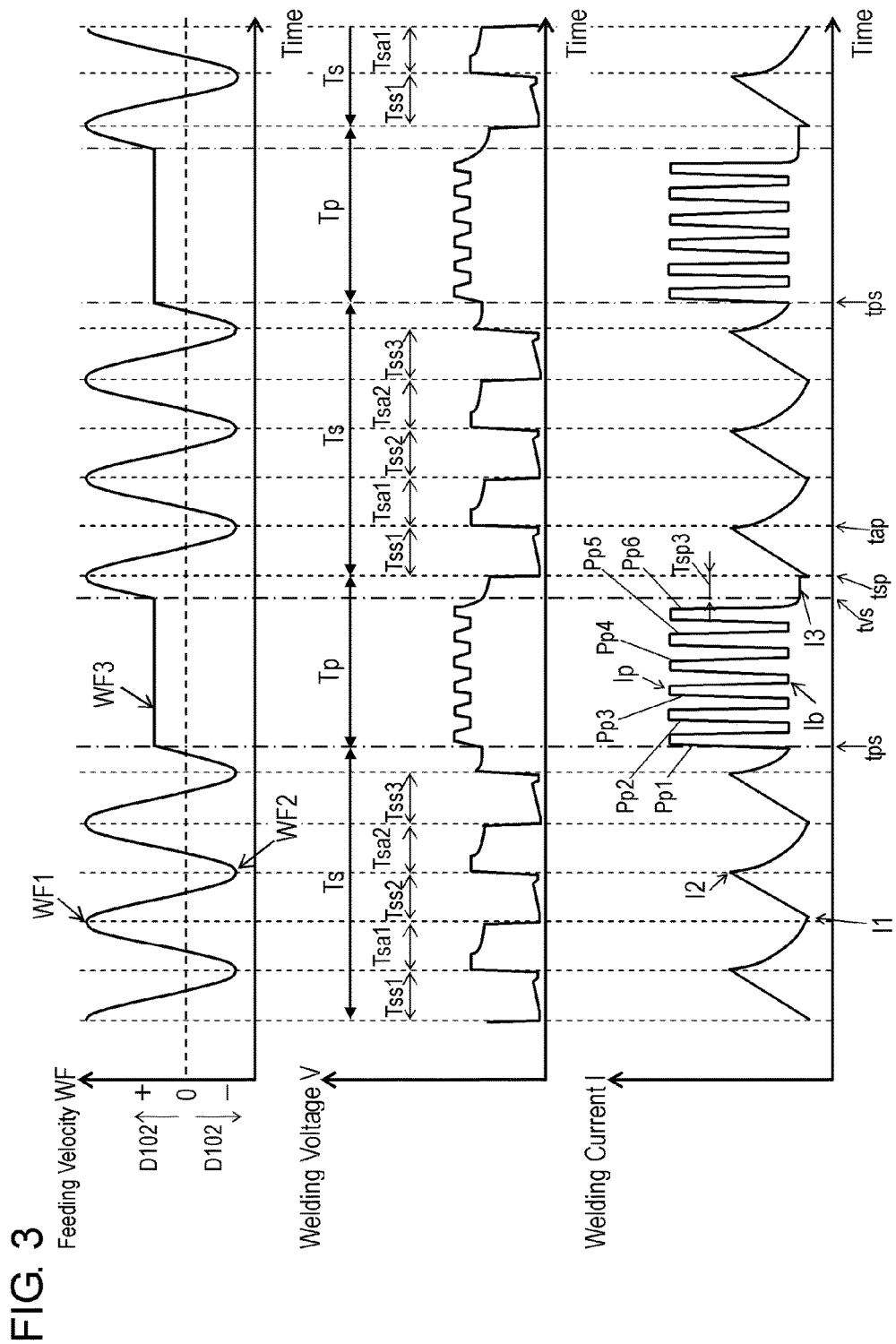
FIG. 3 illustrates a welding current, a welding voltage, and a feeding velocity of a welding wire in arc welding in accordance with Embodiment 2.
Figure 4:
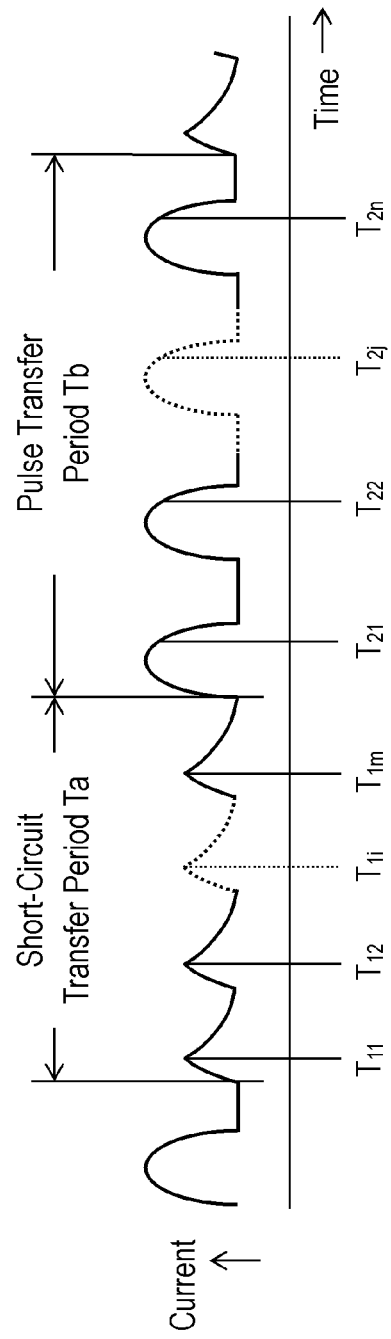
FIG. 4 illustrates a welding current in conventional arc welding.

FIG. 3 illustrates welding current I, welding voltage V, and feeding velocity WF of welding wire 15 in accordance with Exemplary Embodiment 2. Welding current I, welding voltage V, feeding velocity WF illustrated in FIG. 3 can be obtained by arc welding apparatus 50 illustrated in FIGS. 1A and 1B. In FIG. 3, items identical to those of Embodiment 1 illustrated in FIG. 2 will be denoted by the same reference numerals. Arc welding in accordance with Embodiment 2 illustrated in FIG. 3 is different from the arc welding in accordance with Embodiment 1 illustrated in FIG. 2 in the following points. When shifting from short-circuit welding period Ts to pulse welding period Tp, welding current I starts forming first pulse Pp1 as to start pulse welding period Tp at time point tps when feeding velocity WF of welding wire 15 reaches predetermined feeding velocity WF3 in forward feeding direction D101 in pulse welding period Tp. After time point tps, feeding velocity WF is maintained at predetermined feeding velocity WF3. Peak current Ip is generated substantially and immediately after time point tps. In short-circuit welding period Ts, the feeding of welding wire 15 is controlled synchronously to the control of welding current I.

A reason of shifting from short-circuit welding period Ts to pulse welding period Tp when feeding velocity WF of welding wire 15 reaches predetermined feeding velocity WF3 in pulse welding period Tp will be described below. As described above, in the case where welding wire 15 as the welding electrode is fed in forward feeding direction D101, feeding velocity WF has a positive value. In the case where welding wire 15 is fed in backward feeding direction D102, feeding velocity WF has a negative value. In the case where welding wire 15 is fed at low feeding velocity WF, welding wire 15 is fed in forward feeding direction D101 at a low feeding velocity or is fed in backward feeding direction D102. When peak current Ip of pulse Pp1 is generated before feeding velocity WF reaches predetermined feeding velocity WF3, feeding velocity WF of welding wire 15 is low and the feeding velocity of feeding welding wire 15 is low. Otherwise, when the wire is fed in backward feeding direction D102, peak current Ip of pulse Pp1 is generated. Therefore, welding wire 15 may burn up or an arc is cut, thus preventing stable welding performed continuously. On the contrary, in the case where base current Ib is output without generating peak current Ip in pulse Pp1 for a certain duration from time point tps when feeding velocity WF of welding wire 15 reaches predetermined feeding velocity WF3 in pulse welding period Tp, welding current I is small. Therefore, short circuit is generated between welding wire 15 and object 18, and may prevent stable pulse welding.

A synchronous control of feeding welding wire 15 and welding current I in short-circuit welding period Ts will be described below. For example, as shown in FIG. 3, when the feeding velocity of the welding wire is maximum feeding velocity WF1 in short-circuit welding period Ts, welding current I is controlled such that welding current I becomes minimum current I1. Then, feeding velocity WF is reduced and welding current I is increased accordingly. Then, when feeding velocity WF is minimum feeding velocity WF2, welding current I is controlled such that welding current I becomes maximum current I2. This operation is periodically repeated. Based on a feeding speed which is the absolute value of feeding velocity WF which can have positive and negative values, maximum feeding velocity WF1 is a maximum feeding speed in forward feeding direction D101 while minimum feeding velocity WF2 is a maximum feeding speed in backward feeding direction D102.

A reason for the synchronous control of feeding welding wire 15 and welding current I in short-circuit welding period Ts will be described below. In the above-described control, when feeding velocity WF is maximum feeding velocity WF1 in short-circuit welding period Ts, welding current I becomes minimum current I1. Therefore, welding wire 15 moves toward object 18 at maximum feeding velocity WF1 while welding wire 15 can hardly melt, hence facilitating a short circuit between welding wire 15 and object 18. When feeding velocity WF becomes minimum feeding velocity WF2, welding current I becomes maximum current I2. Therefore, welding current I becomes maximum current I2 while welding wire 15 is fed in backward feeding direction D102. Hence, welding wire 15 is melted while being fed in backward feeding direction D102, hence facilitating a release of the short circuit. Welding current I is controlled synchronously to feeding velocity WF. This configuration provides periodical and stable welding even if external disturbance, such as variation of an arc length due to a change in the distance between welding wire 15 and object 18, occurs. When the short circuit occurs a predetermined number of times, feeding velocity WF of welding wire 15 shifts from minimum feeding velocity WF2 to predetermined constant feeding velocity WF3 in pulse welding period Tp previously set through setting section 20 according to the above cyclic waveform. Being triggered at The peak current Ip of pulse welding is output with the time point when the feeding velocity WF reaches the predetermined feeding velocity WF3 in pulse welding period Tp. That is, at the time point when feeding velocity WF reaches predetermined feeding velocity WF3, welding current I starts forming pulse Pp1 to start pulse welding period Tp. When pulses Pp1 to Pp6 are output the number of times or for the duration previously determined through setting section 20, welding current I is reduced from peak current Ip to current I3 smaller than base current Ib, at last pulse Pp6, and current I3 is retained at current I3 for predetermined period Tsp3. The feeding switching time point tvs at which the welding current I reaches current I3 being set as the trigger, feeding velocity WF of welding wire 15 is accelerated from predetermined constant feedling velocity WF3 of pulse welding period Tp and is switched at feeding switching time point tvs to controlling of feeding velocity WF changing in accordance with the cyclic waveform of forward feeding direction D101 and backward feeding direction D102 alternately repeating. In the arc welding shown in FIG. 3, the time when welding current I reaches current I3 is set as the trigger, that is, feeding switching time point tvs. In arc welding in Embodiment 2, an arbitrary time point when welding current I is smaller than base current Ib may be set as a trigger, that is, a feeding switching time point tvs. In the arc welding in accordance with Embodiment 2, in both of switching from short-circuit welding period Ts to pulse welding period Tp and switching from pulse welding period Tp to short-circuit welding period Ts, welding wire 15 is fed in accordance with the cyclic waveform. Therefore, stable welding can be realized. Current I3 is smaller than at least one of one or more values (Ib1 to Ib5) of base current Ib. Current I3 may be smaller than the average value of one or more values (Ib1 to Ib5) of base current Ib or may be smaller than one or more values (Ib1 to Ib5) of base current Ib.

In arc welding in accordance with Embodiment 2, similar to arc welding in accordance with Embodiment 1, welding current I may be steeply reduced at the time point when short circuit is detected or the time point when neck 15A is detected. In this case, welding current I may be equal to or less than minimum current I1. Welding current I is reduce steeply at the time point when the short circuit is detected or the time point when neck 15A is detected, thereby preventing sputter. In accordance with Embodiment 2, the synchronous control of feeding of welding wire 15 and welding current I in short-circuit welding period Ts is performed. Therefore, even if external disturbance, such as variation of an arc length, occurs, periodical and stable welding can be realized.

As described above, the arc welding apparatus 50 is controlled to feed the welding electrode 15 alternately and repetitively in the forward feeding direction D101 and the backward feeding direction D102 at a constant cycle time in each short-circuit welding period Ts. The arc welding apparatus 50 is controlled as to feed the welding electrode 15 in the forward feeding direction D101 at a predetermined feeding velocity WF3 in respective one pulse welding period Tp. After shifting from one arc duration Tsa2 out of the one or more arc durations Tsa1 and Tsa2 in each short-circuit welding period Ts to one short-circuit duration Tss3 out of the one or more short-circuit durations Tss1 to Tss3 in each short-circuit welding period Ts, each short-circuit welding period Ts shifts to respective one pulse welding period Tp when a feeding velocity WF of feeding the welding electrode 15 reaches the predetermined feeding velocity WF3. The welding apparatus 50 is controlled to cause the welding current I start forming a pulse Pp1 out of the plural pulses Pp1 to Pp6 which is firstly formed in respective one pulse welding period Tp.

The arc welding apparatus 50 may be controlled as to cause the feeding velocity WF to repeat a maximum feeding velocity WF1 and a minimum feeding velocity WF2 at the constant cycle time in each short-circuit welding period Ts. In this case, the welding current I becomes a minimum current I1 when the feeding velocity WF reaches the maximum feeding velocity WF1 in each short-circuit welding period Ts. The welding current I becomes a maximum current I2 when the feeding velocity WF reaches the minimum feeding velocity WF2 in each short-circuit welding period Ts.

In the arc welding method in which the pulse welding period and the short-circuit welding period are alternately repeated, when the method disclosed in PTL 2 is used in the short-circuit welding period, the welding wire is fed backward in response to the detection of the short circuit. Accordingly, the short circuit can be mechanically released, the current at the time of short circuit release can be reduced, and generation of sputter can be reduced. However, the cycle time of the forward feeding and the backward feeding of the feeding velocity is controlled in accordance with generation of an arc. Therefore, when the duration of the short circuit increases, the amount of the backward feeding of the welding wire increases. When the duration of an arc increases, the feeding velocity of the welding wire in the forward feeding direction increases. Therefore, when an arc changes, the average feeding velocity of the feeding velocity of the welding wire, the cycle time of short circuit, and number of times of short circuit change. Thus, welding is unlikely to be stable. When switching between the pulse welding period and the short-circuit welding period, discontinuity occurs in controlling of feeding the welding wire and current controlling of the welding current. Therefore, welding may become unstable and sputter is generated.

In the consumable electrode-type arc welding in which pulse welding period Tp and short-circuit welding period Ts are alternately repeated in accordance with Embodiments 1 and 2, welding wire 15 is fed in forward feeding direction D101 and backward feeding direction D102 in short-circuit welding period Ts. Accordingly, the short circuit can be mechanically released, and welding current I can be reduced at the time of the release of the short circuit, hence reducing sputter in short-circuit welding period Ts. In short-circuit welding period Ts, welding wire 15 is fed in accordance with the cyclic waveform. Therefore, there is small fluctuation in the cycle time of short circuit and an arc, thus providing stable welding. The synchronous control of the feeding of welding wire 15 and welding current I reliably performs the short circuit and the release of the short circuit even if there is some external disturbance. Thus, stable welding can be realized. When the short-circuit welding and the pulse welding are alternately repeated, the heat input is controlled and the shape of bead 18A is controlled. Accordingly, welding defect, such as incomplete fusion, or a bead having a preferable shape, such as sagging bead 18A, in position welding can be prevented. In both pulse welding period Tp and short-circuit welding period Ts, it is possible to realize welding in which the generation amount of sputter is small. In switching between the pulse welding and the short-circuit welding, no discontinuity occurs in controlling of feeding welding wire 15 and controlling of welding current I. Thus, stable low-sputter welding can be realized. Therefore, a post-process, such as removing sputter, can be eliminated.

INDUSTRIAL APPLICABILITY

An arc welding control method according to the present invention can provide stable welding and is useful for arc welding for welding an object.

REFERENCE MARKS IN THE DRAWINGS 1 input power source
2 primary rectifier
3 switching section
4 transformer
5 secondary rectifier
6 DCL (inductance)
7 welding voltage detector
8 welding current detector
9 counter
10 control switch
11 current controller
12 current controller
13 driver
14 feeder
15 welding wire (welding electrode)
15A neck
16 welding torch
17 welding arc
18 object
19 welding power source
20 setting section
50 arc welding apparatus
Dd101 forward feeding direction
D102 backward feeding direction
I1 maximum current
I2 minimum current
Ib base current
Ip peak current
Pp1-Pp6 pulse Tp pulse welding period
Ts short-circuit welding period
Tss1-Tss3 short-circuit duration
Tsa1-Tsa3 arc duration
tvs feeding switching time point

The invention claimed is:

1. A method of controlling an arc welding of consumable electrode type, which uses an arc welding apparatus, alternately repeating a pulse welding period and a short-circuit welding period, and alternately shifting to the plurality of pulse welding periods and the plurality of short-circuit welding periods, respectively; the arc welding apparatus including a welding electrode, performing arc welding for the plurality of pulse welding periods and short-circuit welding for the plurality of short-circuit welding periods, the method comprising:

controlling a welding current flowing in the welding electrode in each of the pulse welding period of the plurality of pulse welding periods, such that the welding current forms a plurality of pulses alternately repeating one or more values of a peak current and one or more values of a base current, and becomes smaller than at least one of the one or more values of the base current at a feeding switching time point of a welding wire feed in the pulse welding period for switching from the pulse welding period to the short circuit welding period after forming the plurality of pulses;

controlling the welding current in respective one short-circuit welding period out of the plurality of short-circuit welding periods succeeding the each pulse welding period, as to shift alternately to one or more short-circuit durations for which a short circuit between the welding electrode and an object is generated and to one or more arc durations for which an arc between the welding electrode and the object is generated; and controlling the arc welding apparatus as to feed the welding electrode in a forward feeding direction toward the object and in a backward feeding direction opposite to the forward feeding direction, wherein said controlling the arc welding apparatus as to feed the welding electrode comprises controlling the arc welding apparatus as to start, at the feeding switching time point in the pulse welding period, feeding the welding electrode alternately and repetitively in the forward feeding direction and the backward feeding direction at a constant cycle time, and feed the welding electrode alternately and repetitively in the forward feeding direction and the backward feeding direction at the constant cycle time from the feeding switching time point through the respective one short-circuit welding period.

2. The method of claim 1, wherein said controlling the arc welding apparatus as to feed the welding electrode comprises controlling the arc welding apparatus such that a feeding velocity of the welding electrode fed in the respective one short-circuit welding period repeats a maximum feeding velocity and a minimum feeding velocity at the constant cycle time, and wherein said controlling the welding current in the respective one short-circuit welding period comprises:

causing the welding current to be a minimum current when the feeding velocity reaches the maximum feeding velocity in the respective one short-circuit welding period; and causing the welding current to be a maximum current when the feeding velocity reaches the minimum feeding velocity in the respective one short-circuit welding period.

3. The method of claim 1, wherein said controlling the arc welding apparatus as to feed the welding electrode further comprises controlling the arc welding apparatus as to feed the welding electrode at a predetermined constant feeding velocity until the feeding switching time point in the each pulse welding period.

4. The method of claim 1, further comprising detecting a short circuit between the object and the welding electrode or a neck of the welding electrode in the respective one short-circuit welding period, wherein said controlling the welding current in the respective one short-circuit welding period comprises reducing the welding current upon detecting the short circuit or the neck.

5. The method of claim 1, wherein said controlling the welding current in the each pulse welding period comprises controlling the welding current in the each pulse welding period such that the welding current becomes smaller than an average value of the one or more values of the base current at the feeding switching time point.

6. A method of controlling an arc welding of consumable electrode type which uses an arc welding apparatus, alternately repeating a pulse welding period and a short-circuit welding period, and alternately shifting to the plurality of pulse welding periods and the plurality of short-circuit welding periods, respectively; the arc welding apparatus including a welding electrode, performing arc welding for the plurality of pulse welding periods and short-circuit welding for the plurality of short-circuit welding periods, the method comprising:

controlling a welding current flowing in the welding electrode in each of the short-circuit welding period of the plurality of short-circuit welding periods, as to shift alternately and respectively to one or more short-circuit durations for which a short circuit between the welding electrode and an object is generated and to one or more arc durations for which an arc between the welding electrode and the object is generated;

controlling the welding current in respective one pulse welding period out of the plurality of pulse welding periods succeeding the each short-circuit welding period such that the welding current forms a plurality of pulses alternately repeating a peak current and a base current; and controlling the arc welding apparatus as to feed the welding electrode in a forward feeding direction toward the object and a backward feeding direction opposite to the forward feeding direction, wherein said controlling the arc welding apparatus as to feed the welding electrode comprises:

controlling the arc welding apparatus as to feed the welding electrode alternately and repetitively in the forward feeding direction and the backward feeding direction at a constant cycle time in the each short-circuit welding period; and controlling the arc welding apparatus as to feed the welding electrode in the forward feeding direction at a predetermined feeding velocity in the respective one pulse welding period, and wherein said controlling the welding current in the each short-circuit welding period comprises:

after shifting from one arc duration out of the one or more arc durations in the each short-circuit welding period to one short-circuit duration out of the one or more short-circuit durations in the each short-circuit welding period, shifting to the respective one pulse welding period when a feeding velocity of feeding the welding electrode reaches the predetermined feeding velocity; and controlling the welding current to cause the welding current start forming a pulse out of the plurality of pulses which is firstly formed in the respective one pulse welding period.

7. The method of claim 6, wherein said controlling the arc welding apparatus as to feed the welding electrode comprises controlling the arc welding apparatus as to cause the feeding velocity to repeat a maximum feeding velocity and a minimum feeding velocity at the constant cycle time in the each short-circuit welding period, and wherein said controlling the welding current in the each short-circuit welding period comprises:

causing the welding current to be a minimum current when the feeding velocity reaches the maximum feeding velocity in the each short-circuit welding period; and causing the welding current to be a maximum current when the feeding velocity reaches the minimum feeding velocity in the each short-circuit welding period.

8. The method of claim 6, further comprising detecting a short circuit between the object and the welding electrode or a neck of the welding electrode in the each short-circuit welding period, wherein said controlling the welding current in the each short-circuit welding period comprises reducing the welding current upon detecting the short circuit or the neck.

9. The method of claim 7, further comprising detecting a short circuit between the object and the welding electrode or a neck of the welding electrode in the each short-circuit welding period, wherein said controlling the welding current in the each short-circuit welding period comprises reducing the welding current upon detecting the short circuit or the neck.

\* \* \* \* \*